United States Patent
Prisby et al.

(10) Patent No.: US 10,344,936 B2
(45) Date of Patent: Jul. 9, 2019

(54) VEHICLE LIGHT ASSEMBLY

(71) Applicant: Nissan North America, Inc., Franklin, TN (US)

(72) Inventors: Chris Prisby, Farmington Hills, MI (US); Jason Nantais, Royal Oak, MI (US); Sarah Ford, Linden, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/715,771

(22) Filed: Sep. 26, 2017

(65) Prior Publication Data

US 2019/0093854 A1    Mar. 28, 2019

(51) Int. Cl.
| | |
|---|---|
| *F21V 9/00* | (2018.01) |
| *F21S 43/235* | (2018.01) |
| *B60Q 1/26* | (2006.01) |
| *F21V 8/00* | (2006.01) |
| *F21S 41/00* | (2018.01) |
| *F21S 43/14* | (2018.01) |

(52) U.S. Cl.
CPC .......... *F21S 43/235* (2018.01); *B60Q 1/2696* (2013.01); *F21S 41/00* (2018.01); *F21S 43/14* (2018.01); *G02B 6/0055* (2013.01)

(58) Field of Classification Search
CPC .......... B60Q 1/04; B60Q 1/2696; B60Q 1/28; B60Q 1/30; B60Q 1/44; F21S 41/00; F21S 41/141–153; F21S 41/20–295; F21S 43/14; F21S 43/20–251; F21S 43/26–27; G02B 6/0055

USPC .................. 362/509–511, 520–522, 543–545
See application file for complete search history.

(56) References Cited

U.S. PATENT DOCUMENTS

| | | | |
|---|---|---|---|
| 9,506,619 B2 | 11/2016 | Buisson | |
| 2016/0084467 A1* | 3/2016 | Kaneko | F21S 43/249 362/511 |
| 2016/0273731 A1* | 9/2016 | Schiccheri | F21S 43/27 |

FOREIGN PATENT DOCUMENTS

| | | |
|---|---|---|
| CN | 202532353 U | 11/2012 |
| FR | 2978395 B1 | 8/2013 |

* cited by examiner

*Primary Examiner* — Jason M Han
(74) *Attorney, Agent, or Firm* — Young Basile Hanlon & MacFarlane, P.C.

(57) ABSTRACT

A low profile light assembly for a vehicle. The assembly includes a first lens having an outer profile that provides a portion of an external profile of the vehicle. The assembly also includes a second lens disposed on a side of the first lens that is opposite the outer profile. The light assembly also includes a light curtain that includes a first side that corresponds to a portion of an inner profile of the second lens and a second side, opposite the first side, that includes protrusions evenly spaced along a length of the second side, the protrusions include a first surface that extends a width of the second side. The assembly also includes at least one light source that is directed toward at least some of the first surfaces of the protrusions.

18 Claims, 8 Drawing Sheets

US 10,344,936 B2

VEHICLE LIGHT ASSEMBLY

TECHNICAL FIELD

This disclosure relates to vehicle light assemblies.

BACKGROUND

A vehicle, such a passenger vehicle or commercial vehicle, typically utilizes various light assemblies to illuminate a path the vehicle is traversing, to indicate an intent of an operator of the vehicle (e.g., turn signals, brake lights, other suitable indicators, or a combination thereof), to alert operators of other vehicles of a location of the vehicle (e.g., fog lights, side indicator lights, other suitable lights, or a combination thereof), for other suitable situations, or a combination thereof.

Typically, a light assembly includes an incandescent light bulb disposed within the light assembly at a location that, when the light bulb is illuminated, the light emitted from the light bulb interacts with a cover or lens of the light assembly such that light from the light bulb illuminates a portion of the lens. As light bulb technology has advanced, incandescent light bulbs are being replaced by alternative light sources such as light emitting diodes (LED). LEDs typically require less energy to provide a similar number of lumens (e.g., a measure of an amount light emitted per second from a light source) as a comparable incandescent bulb. Further, LEDs typically have a longer life span than a comparable incandescent bulb.

SUMMARY

Disclosed herein are implementations of features, elements, implementations, and embodiments of vehicle light assemblies.

An aspect of the disclosed embodiments is a low profile light assembly for a vehicle. The assembly includes a first lens that has an outer profile that provides a portion of an external profile of the vehicle. The assembly also includes a second lens disposed on a side of the first lens that is opposite the outer profile. The light assembly also includes a light curtain that includes a first side that corresponds to a portion of an inner profile of the second lens and a second side, opposite the first side, that includes protrusions evenly spaced along a length of the second side, the protrusions include a first surface that extends a width of the second side. The assembly also includes at least one light source that is directed toward at least some of the first surfaces of the protrusions.

Another aspect of the disclosed embodiments is a system that includes a first lens that has an outer profile that provides a portion of an external profile of a vehicle. The system also includes a second lens disposed on a side of the first lens that is opposite the outer profile. The system also includes a light curtain that includes a first side that corresponds to a portion of an inner profile of the second lens and a second side, opposite the first side, that includes protrusions evenly spaced along a length of the second side, the protrusions include a first surface that extends a width of the second side. The system also includes at least one light source disposed on a third side of the light curtain that is adjacent to the first and second sides of the light curtain, wherein the at least one light source is directed toward at least some of the first surfaces of the protrusions.

Another aspect of the disclosed embodiments is a light assembly for a vehicle that includes a first lens that has an outer profile that provides a portion of an external profile of the vehicle and a second lens disposed on a side of the first lens that is opposite the outer profile. The assembly also includes a light curtain that includes a first side that corresponds to a portion of an inner profile of the second lens and a second side, opposite the first side, that has an arcuate shape that includes protrusions spaced two millimeters apart along a length of the second side, the protrusions include a first surface that extends a width of the second side. The assembly also includes at least one light source disposed on a third side of the light curtain that is adjacent to the first and second sides of the light curtain, wherein the at least one light source is directed toward at least some of the first surfaces of the protrusions.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
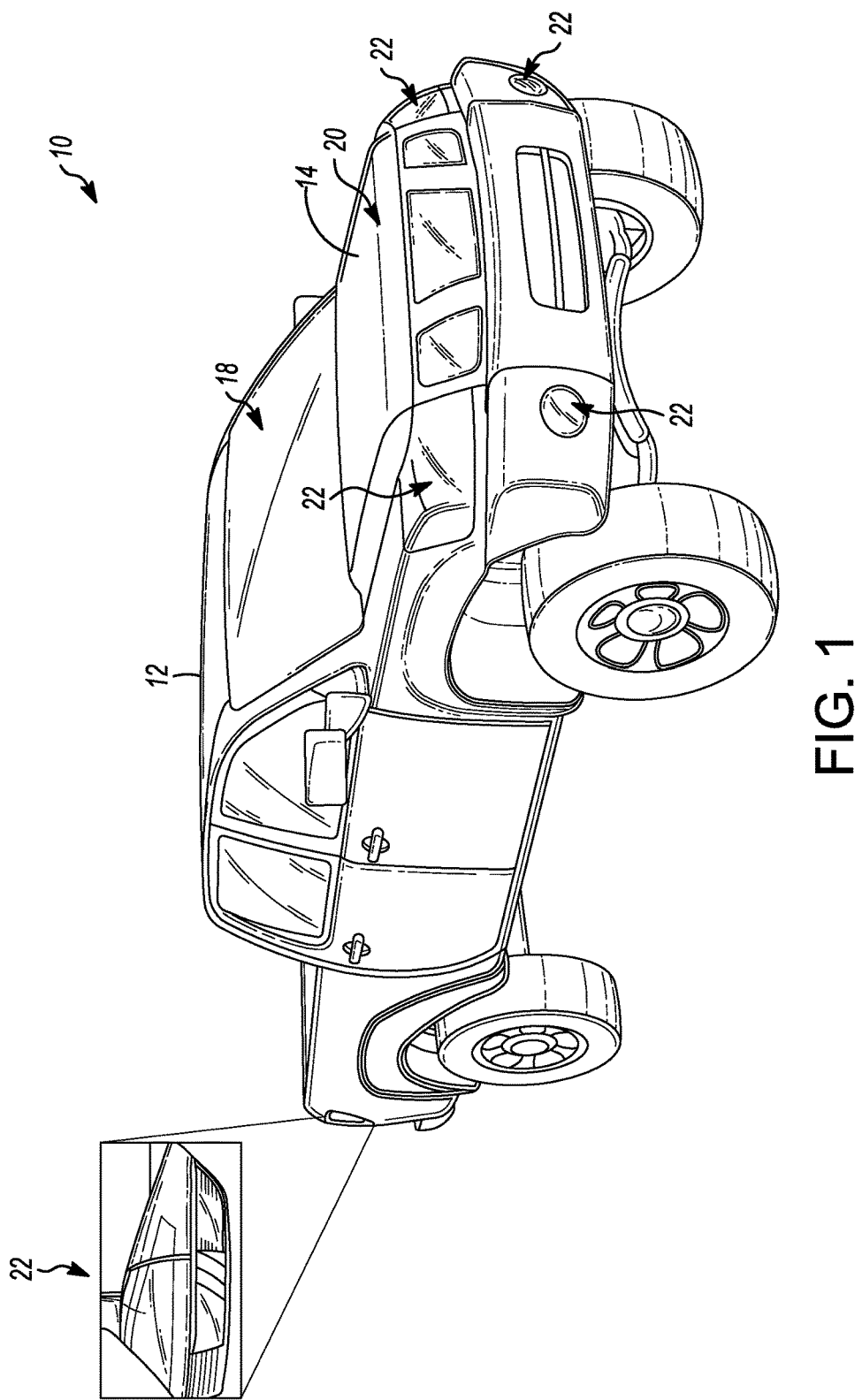
FIG. 1 generally illustrates a perspective view of a vehicle according to the principles of the present disclosure.

A vehicle, such a passenger vehicle or commercial vehicle, typically utilizes various light assemblies to illuminate a path the vehicle is traversing, to indicate an intent of an operator of the vehicle (e.g., turn signals, brake lights, other suitable indicators, or a combination thereof), to alert operators of other vehicles of a location of the vehicle (e.g., fog lights, side indicator lights, other suitable lights, or a combination thereof), for other suitable situations, or a combination thereof.

Typically, a light assembly includes an incandescent light bulb disposed within the light assembly at a location that, when the light bulb is illuminated, light emitted from the light bulb interacts with a cover or lens of the light assembly such that light from the light bulb illuminates a portion of the lens. As light bulb technology has advanced, incandescent light bulbs are being replaced by alternative light sources such as fluorescent bulbs, halogen bulbs, light emitting diodes (LED), or other suitable alternative sources. In particular, LEDs typically require less energy to provide a similar number of lumens (e.g., a measure of an amount light emitted per second from a light source) as a comparable incandescent bulb. Further, LEDs typically have a longer life span than a comparable incandescent bulb. Accordingly, LEDs are often used as a direct replacement for incandescent bulbs in vehicle light assemblies.

While LEDs tend to provide the same output and typically last longer than standard incandescent bulbs, LEDs may include undesirable characteristics. For example, LEDs may create an undesirable glare when being observed directly. An incandescent bulb in a typical vehicle tail light assembly is disposed such that the incandescent bulb directly faces a lens of the vehicle tail light assembly. An LED disposed in a vehicle tail light assembly in the same or substantially the same position as the incandescent bulb may create an undesirable glare when observed. Accordingly, LEDs may be disposed within a vehicle light assembly such that the LEDs are not directly observable. For example, one or more light pipes may be disposed within a vehicle light assembly. A light pipe may be cylindrical or substantially cylindrical and may extend from one side of a vehicle light assembly to another side of the vehicle light assembly. An LED may be directed toward a first end of a respective light pipe such that light emitted from the LED illuminates a length of the light pipe. A light pipe may include a relatively large surface area, which may be an undesirable characteristic in situation where space is limited. Accordingly, a low profile vehicle light assembly that uses LEDs indirectly disposed within the vehicle light assembly may be desirable.

In some embodiments, a low profile vehicle light assembly, according to the principles of the present disclosure, may include a light curtain that includes an arcuate profile. The light curtain includes a plurality of protrusions adapted to reflect light from a light source. The vehicle light assembly further includes one or more LEDs disposed at a side of the light curtain such that light emitted from the one or more LEDs is directed toward a side of one or more respective protrusions. The light curtain is adapted to homogenously or substantially homogenously distribute light emitted from the LEDs across a length of the light current. For example, the protrusions are evenly disposed along the length of the light curtain. The protrusions are adapted to reflect the light emitted from the LEDs which causes the light to be distributed across the length of the light curtain in a homogenous or substantially homogenous manner. The light curtain is illuminated as a result of the protrusions reflecting the light emitted from the LEDs.

FIG. 1 generally illustrates a perspective view of a vehicle 10 according to the principles of the present disclosure. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood 14 is in a first or open position and the hood 14 covers the engine compartment when the hood 14 is in a second or closed position.

The passenger compartment 18 is disposed rearward of the engine compartment 20. The vehicle 10 includes a plurality of lights 22 disposed at various locations on an exterior portion of the vehicle 10. The plurality of lights 22 may include head lights, tail lights, turn signaling lights, brake lights, fog lights, other suitable lights, or a combination thereof. The vehicle 10 may include an internal combustion engine, one or more electric motors, and/or a combination thereof. For example: the vehicle 10 may include a petrol or gasoline fuel engine, such as a spark ignition engine; the vehicle 10 may include a diesel fuel engine, such as a compression ignition engine; the vehicle 10 may include an electric motor that uses energy from a battery of the vehicle 10 to power the vehicle 10; or a combination thereof. The engine compartment 20 houses and/or encloses components of, for example, a compression ignition engine. The vehicle 10 an autonomous or semi-autonomous vehicle or other suitable type of vehicle. The vehicle 10 may include additional or fewer features than those generally illustrated and/or disclosed herein. Additionally, or alternatively, the vehicle 10 may include a car, a truck, a sport utility vehicle, a plane, a boat, a train car, and/or other suitable mass transit or passenger vehicles.

Figure 2:
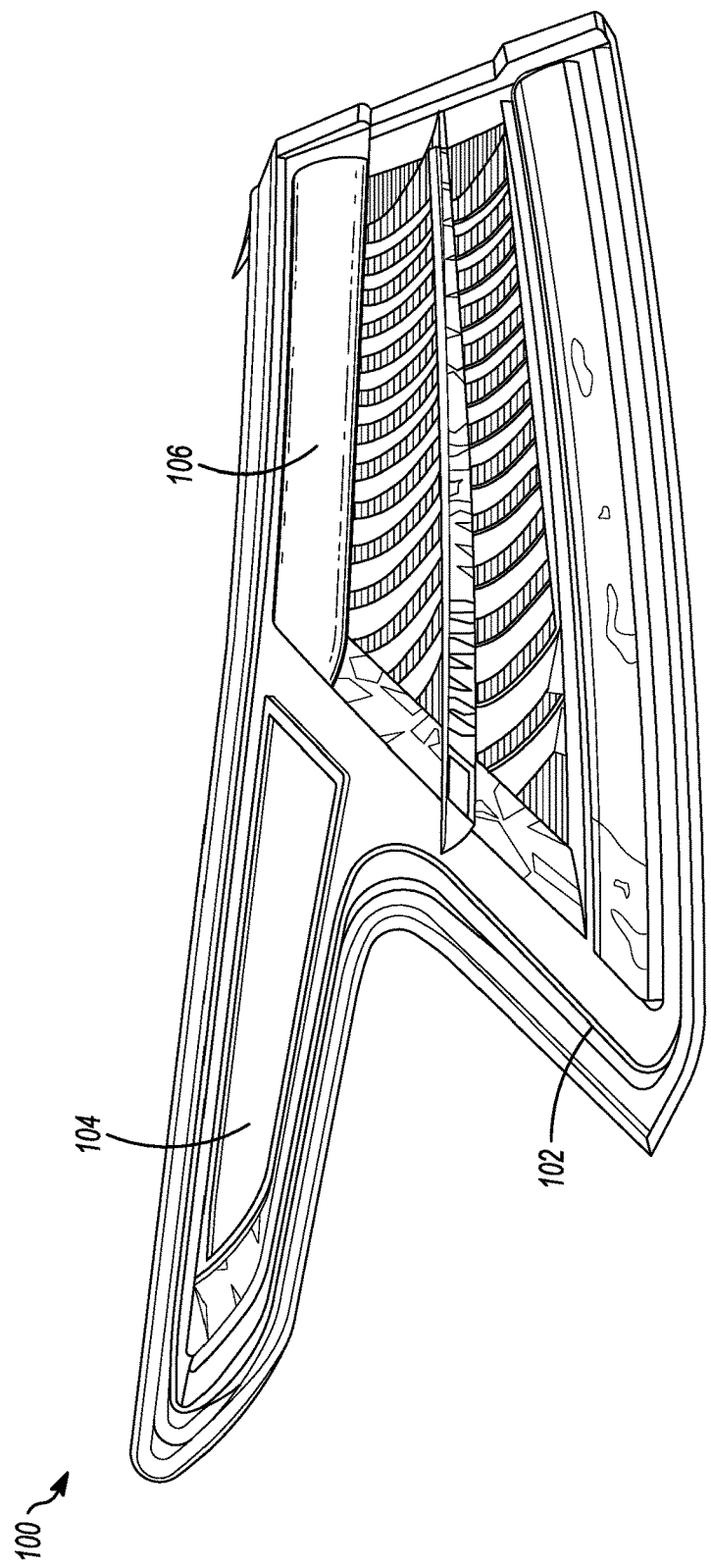
FIG. 2 generally illustrates a vehicle light assembly according to the principles of the present disclosure.

FIG. 2 generally illustrates a vehicle light assembly 100 according to the principles of the present disclosure. The vehicle light assembly 100 is adapted to be coupled or attached to a portion of a vehicle, such as the vehicle 10 of FIG. 1. The vehicle light assembly 100 may comprise low profile light assembly. A low profile light assembly may include a light assembly that includes relatively thin or compact components that, when assembled to form the vehicle light assembly 100, requires less space within the vehicle 10 than non-low profile assemblies. The vehicle light assembly 100 includes an external profile that defines at least a portion of an external profile of the vehicle 10 when the vehicle light assembly 100 is coupled or attached to the vehicle 10. The vehicle light assembly 100 may comprise a vehicle tail light assembly for the vehicle 10, a vehicle brake light assembly for the vehicle 10, a vehicle head light assembly for the vehicle 10, or other suitable vehicle light assembly for the vehicle 10. For example, the vehicle light assembly 100 may include a brake light. When the vehicle light assembly 100 is coupled or attached to the vehicle 10, the vehicle light assembly 100 may provide an indication to operators of other vehicles in close proximity to the vehicle 10 that the vehicle 10 brakes have been applied (e.g., that the vehicle 10 is slowing down and/or stopping).

The vehicle light assembly 100 includes an outer lens 102, a first light portion 104, and a second light portion 106. The outer lens 102 may comprise a polymer lens, a glass lens, or other suitable material lens. The outer lens 102 defines the external profile of the vehicle light assembly 100. The outer lens 102 encases or covers the first light portion 104 and the second light portion 106. As will be described in detail below, the first light portion 104 and the second light portion 106 are adapted to emit light. Light emitting from the first light portion 104 and/or the second light portion 106 is directed toward the outer lens 102.

The light emitting from the first light portion 104 and/or the second light portion 106 engages at least a portion of the outer lens 102. The outer lens 102 may alter an appearance of the characteristics of the light emitted from the first light portion 104 and/or the second light portion 106 as the light passes through the outer lens 102. The outer lens 102 may be a transparent lens or may have one or more tinted portions. For example, a portion of the outer lens 102 may be transparent and another portion of the outer lens 102 may be tinted a color, such as red. When light emitted from the first light portion 104 and/or the second light portion 106 engages the outer lens 102, characteristics of the appearance of the emitted light may be altered by a shape or profile of the outer lens 102, by a color of the outer lens 102, by other characteristics of the outer lens 102, or a combination thereof. For example, light emitted from the first light portion 104 may a white light emitted at a first angle. When the light emitted from the first light portion 104 engages a portion of the outer lens 102 that is tinted red, the light emitted from the first light portion 102 may appear red as the light passes through the portion of the outer lens 102. Additionally, or alternatively, the angle of the light may change based on a shape or profile of the outer lens 102.

Figure 3:
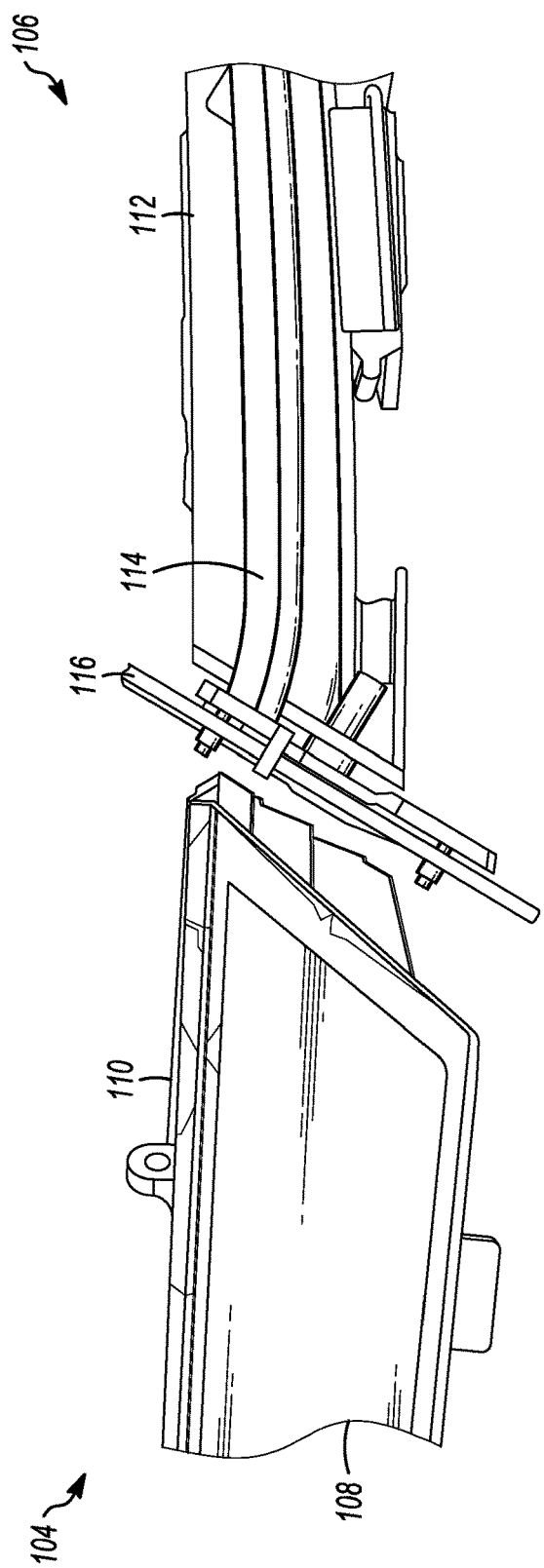
FIG. 3 generally illustrates a detailed view of a portion of the vehicle light assembly of FIG. 2.

FIG. 3 generally illustrates a detailed view of a portion of the first light portion 104 and a portion the second light portion 106 of the vehicle light assembly 100 of FIG. 2. In some embodiments, the first light portion 104 is disposed adjacent the second light portion 106, however, the first light portion 104 may be disposed in any suitable location relative to the second light portion 106.

The first light portion 104 includes an inner lens 108, a light curtain 110, and a printed circuit board (PCB) 116. The second light portion 106 includes one or more reflectors 112 and one or more light pipes 114. The one or more light pipes 114 may be disposed along a surface of the second light portion 106 and may include a cylindrical or substantially cylindrical profile. In some embodiments, a light source may be directed toward a first end of a corresponding light pipe 114. The light source may include one or more incandescent bulbs, light emitting diodes (LED), halogen bulbs, xenon bulbs, other suitable light bulbs, or a combination thereof.

Light emitted from the light source may travel along a length of the light pipe 114 from the first end of the light pipe 114 to a second end of the light pipe 114. As light emitted from the light source travels from the first end of the light pipe 114 to the second of the light pipe 114, the light pipe 114 is illuminated by the emitted light. Characteristics of the light pipe 114, such as shape, size, material, other suitable characteristics, or a combination thereof, may alter the appearance of the light emitted from the light source at the first end of the light pipe 114. For example, the light emitted from the light source at the first end of the light pipe 114 may appeared to be amplified by a size of the light pipe 114. The reflector 112 reflects light from the light pipe 114 toward the outer lens 102 of FIG. 2. As described above, the appearance of the light emitted from the second light portion 106 (e.g., from the light pipe 114) may be altered by the outer lens 102.

In some embodiments, as will be described in detail, the PCB 116 is fixedly coupled or attached to a portion of the second light portion 106. For example, the PCB 116 is fixedly coupled to an end of the second light portion 106 that is proximal to the first light portion 104. The PCB 116 may include one or more light sources that are directed toward the light curtain 110.

Figure 4A:
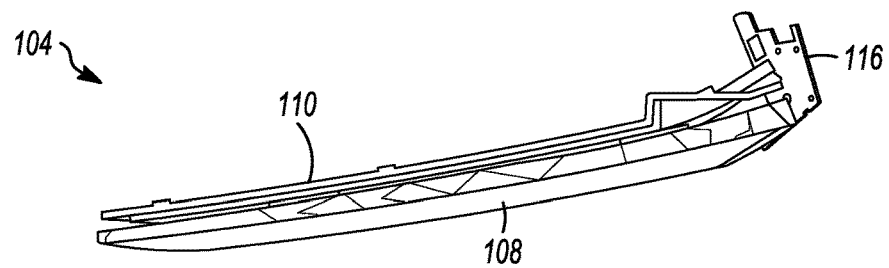
FIGS. 4A-4C generally illustrate a portion of the vehicle light assembly of FIG. 2.
Figure 4B:
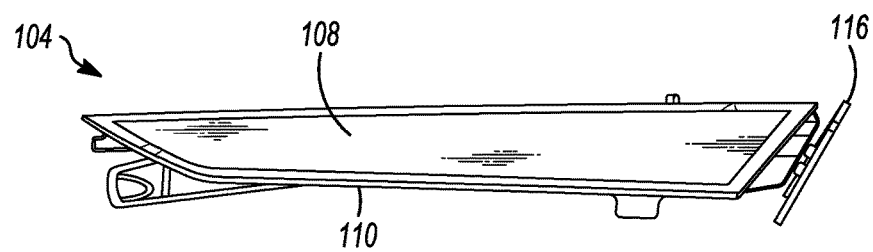
Figure 4C:
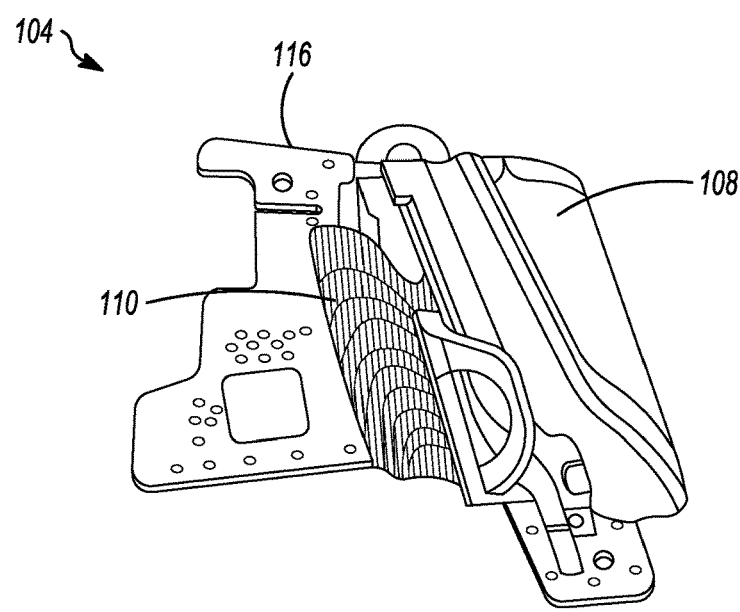
Figure 5:
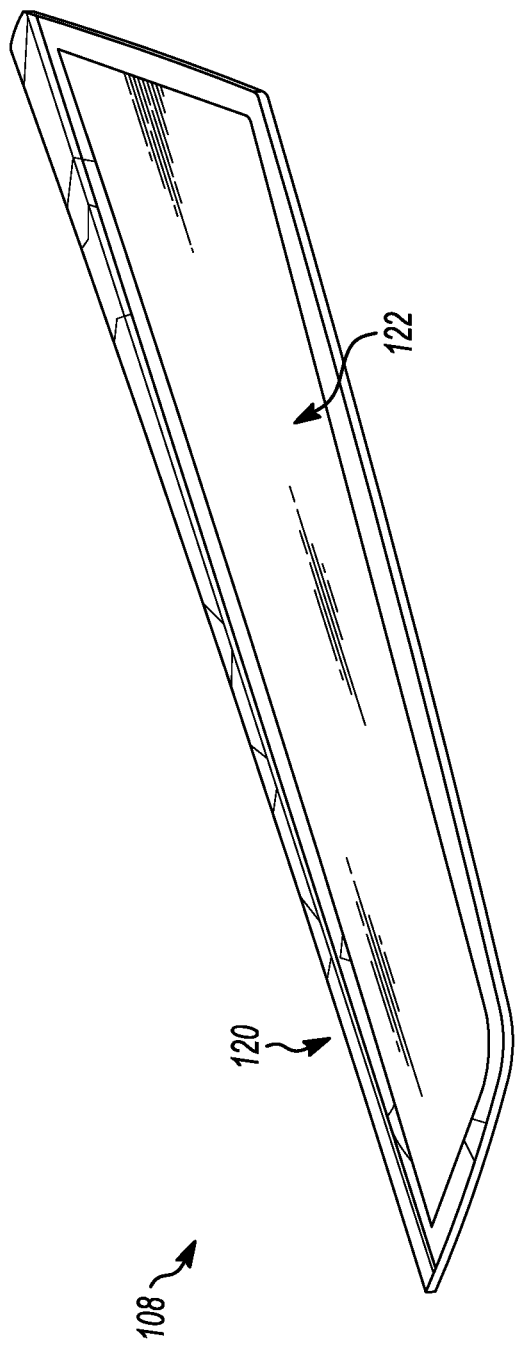
FIG. 5 generally illustrates a perspective view of a lens of the portion of the vehicle light assembly of FIGS. 4A-4C.
Figure 6:
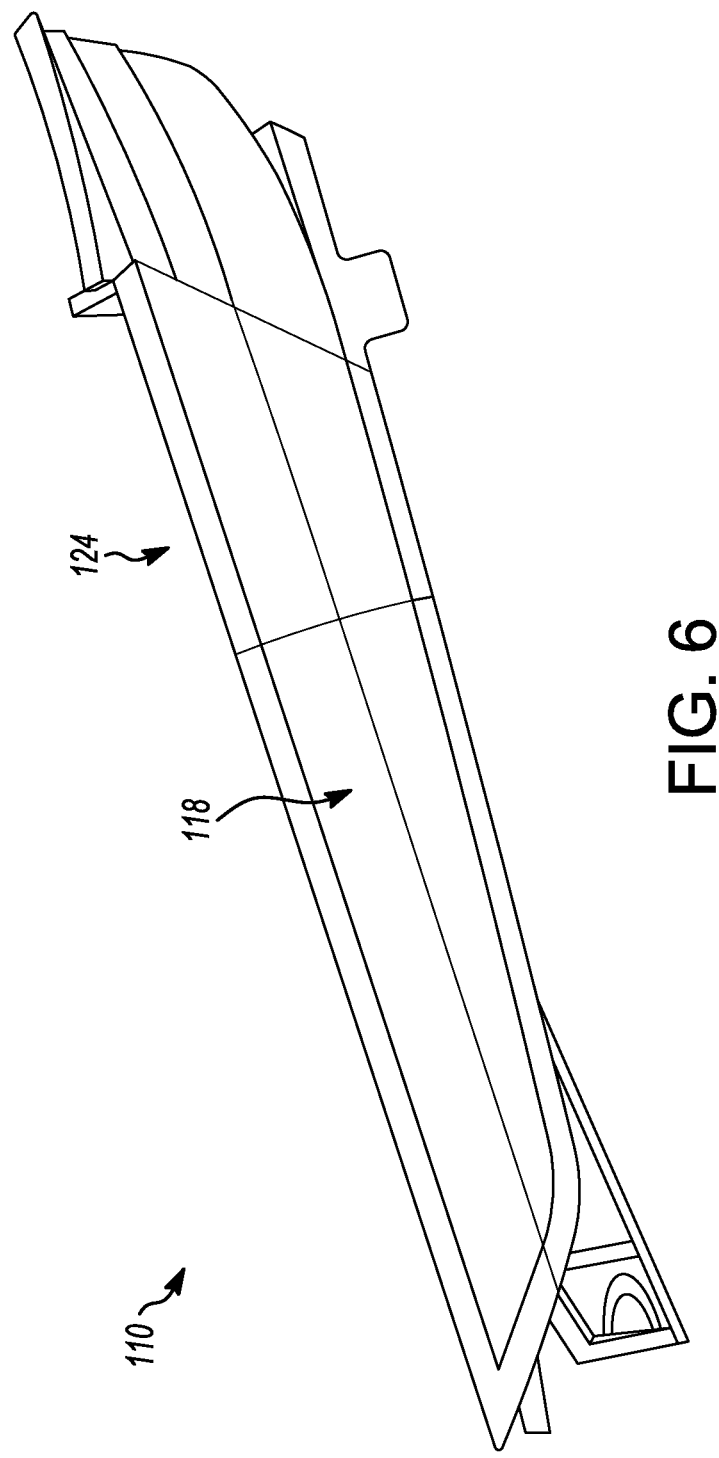
FIG. 6 generally illustrates a front perspective view of a light curtain of the portion of the vehicle light assembly of FIGS. 4A-4C.

As is generally illustrated in FIGS. 4A-4C, the light curtain 110 is adapted to be coupled or attached to at least a portion of the inner lens 108. For example, a first side 118 of the light curtain 110, as is generally illustrated in FIG. 6, is includes a profile correspond to an inner profile of a first side 120 of the inner lens 108, as is generally illustrated in FIG. 5. For example, the profile of the first side 118 of the light curtain 110 is adapted to mate with the inner profile of the first side 120 of the inner lens 108. The light curtain 110 may be press-fit onto the inner lens 108, secured by one or more fasteners, or attached to the inner lens 108 using other suitable methods. The inner lens 108 is disposed between the outer lens 102 of the vehicle light assembly 100 and the light curtain 110 such that a second side 122 of the inner lens 108 faces a side of the outer lens 102 opposite the external profile of the outer lens 102, as described above. The inner lens 108 may comprise a polymer lens, a glass lens, or other suitable lens. The inner lens 108 may be transparent and/or at least a portion of the inner lens 108 may be tinted. An appearance of light emitted from the light curtain 110, as will be explained in detail, may be altered by characteristics of the inner lens 108.

Figure 7:
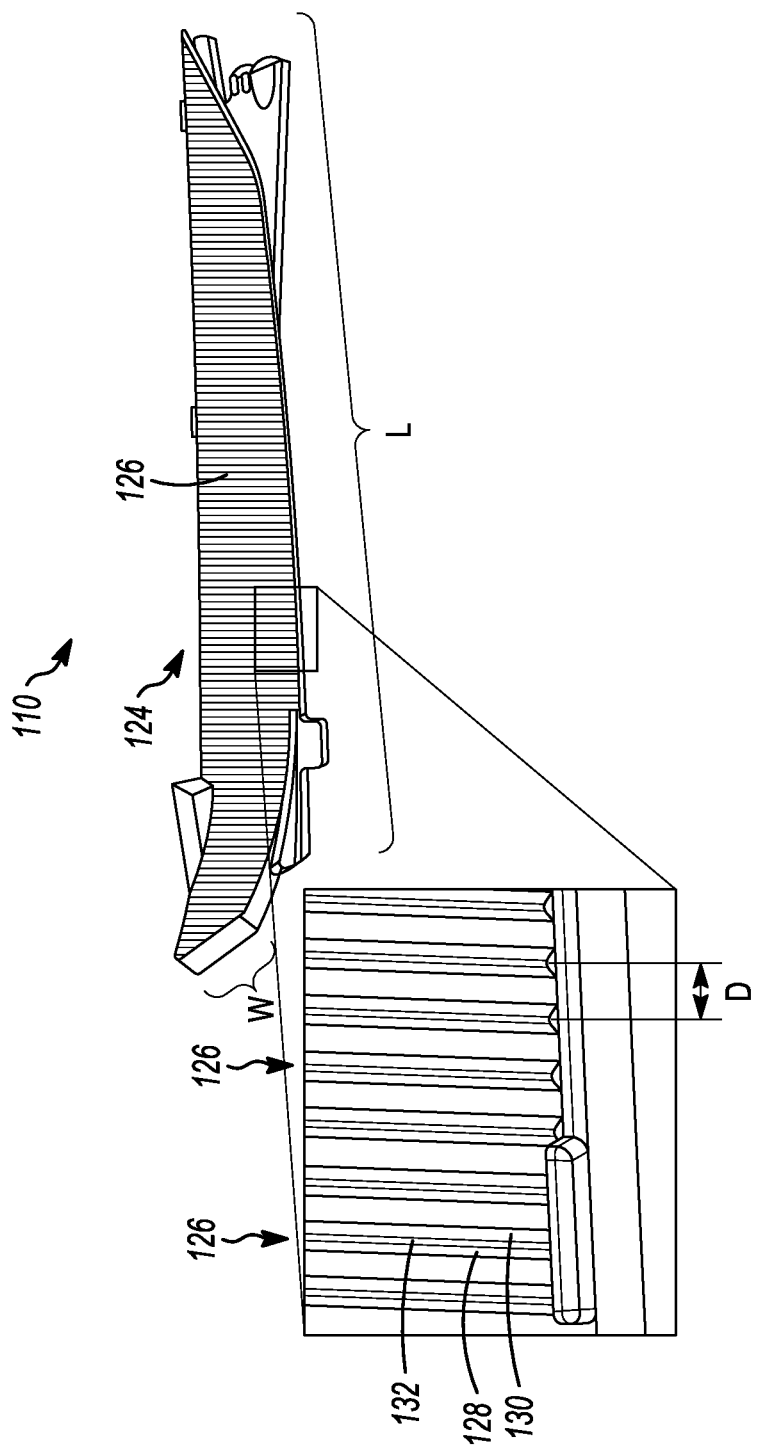
FIG. 7 generally illustrates a rear perspective view of the light curtain of FIG. 6.

As is generally illustrated in FIGS. 6 and 7, the light curtain 110 may comprise a polymer light curtain, a glass light curtain, or other suitable light curtain. The light curtain 110 is adapted to distribute light directed toward the light curtain 110. In some embodiments, the light curtain 110 is adapted to provide a homogenous or substantially homogenous distribution of the light directed toward the light curtain 110. The light curtain 110 includes a second side 124 that is disposed on the light curtain 110 opposite the first side 118. The second side 124 includes an arcuate or substantially arcuate profile.

The second side 124 of the light curtain 110 includes a plurality of protrusions 126. The protrusions 126 are evenly or substantially evenly disposed along a length L of the second side 124 by a distance D. In some embodiments, the length L may be within a range from 225 millimeters to 230 millimeters. The distance D may include any suitable distance. For example, the distance D may include 2 millimeters, 3 millimeters, or other suitable distance. The second side 124 includes a width W. In some embodiments, the width W may be within a range from 35 millimeters to 45 millimeters. The protrusions 126 extend the width W of the second side 124.

Each of the protrusions 126 includes a first surface 128 and a second surface 130 separated from the first surface 128 by an intermediate portion 132. Each of the first surface 128, the second surface 130, and the intermediate portion 132 for each corresponding protrusion 126 includes flat or substantially flat surfaces and extends the width W of the second side 124. In some embodiments, the first surface 128 is disposed at an acute angle from the intermediate portion 132 and the second surface 130 is disposed at an acute angle from the intermediate portion 132, opposite the first surface 128. While only limited examples are described herein, the angle between the first surface 128 and the intermediate portion 132 may comprise other suitable angles than those described herein. Similarly, the angle between the second surface 130 and the intermediate portion 132 may comprise other suitable angles than those described herein.

The protrusions 126 are adapted to reflect light directed toward the light curtain 110. For example, a light source may directed toward one or more of the first surface 128, the second surface 130, and the intermediate portion 132 of a first protrusion 126. The light source may be directed toward the one or more of the first surface 128, the second surface 130, and the intermediate portion 132 of the first protrusion 126 such that the first protrusion 126 reflects the light emitted from the light source. Light reflected by the first protrusion 126 may then engage and/or make contact with one or more of the first surface 128, the second surface 130, and the intermediate portion 132 of a second protrusion 126 at an angle that causes the second protrusion 126 to reflect the light reflected by the first protrusion 126. As light is reflect from one protrusion 126 to another protrusion 126 across the length of the second side 124 of the light curtain 110, the light curtain 110 is illuminated. The illumination of the light curtain 110 may include a homogenous or substantially homogenous distribution of the light emitted from the light source.

Figure 8:
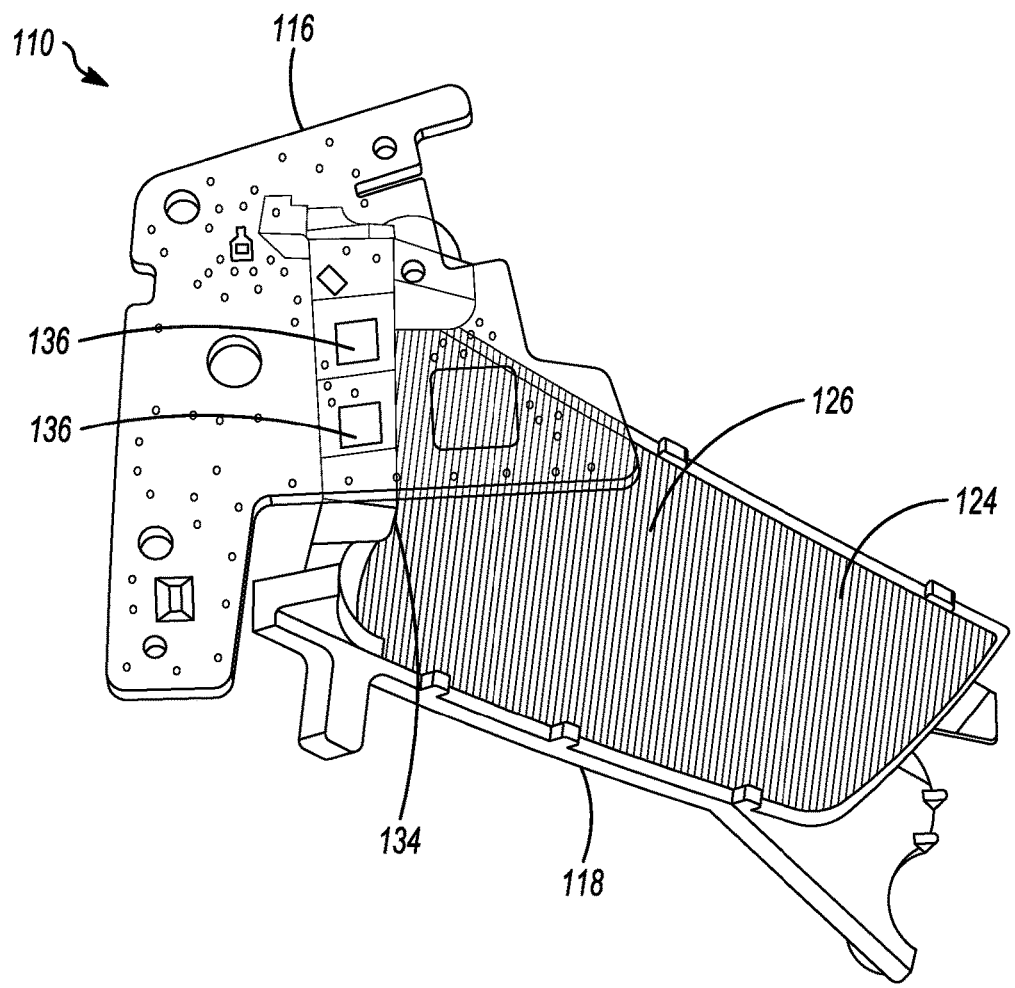
FIG. 8 generally illustrates a side view of the light curtain of FIG. 6.

FIG. 8 generally illustrates a side view of the light curtain 110 of FIG. 6. As described above, the PCB 116 is coupled or attached to the second light portion 106 of the vehicle light assembly 100. The PCB 116 is disposed at or near a third side 134 of the light curtain 110 when the PCB 116 is coupled or attached to the second light portion 106. The third side 134 of the light curtain 110 is adjacent the first side 118 and the second side 124 of the light curtain 110.

The PCB 116 may be in communication with one or more vehicle computers and/or sensors. For example, the vehicle light assembly 100 may comprise a tail light assembly for a vehicle 10. The vehicle light assembly 100 may be illuminated when the vehicle's 10 exterior lights are turned on. A vehicle computer may determine whether a switch within the vehicle 10 that controls the exterior lights is in the on position. The vehicle computer communicates a signal to the PCB 116 indicating that the switch is in the on position. The PCB 116 includes one or more light sources 136. The one or more light sources 136 are in electrical communication with the PCB 116. The PCB 116 illuminates the one or more light sources 136 responsive to the signal received from the vehicle computer.

The one or more light sources 136 may include incandescent bulbs, LEDs, halogen bulbs, xenon bulbs, other suitable light bulbs, or a combination thereof. For example, the PCB 116 includes a first light source 136 comprising an LED and a second light source 136 comprising an LED.

The light sources 136 are directed toward one or more protrusions 126, as described above. For example, the light sources 136 are directed toward one or more first surfaces 128 of respective ones of the protrusions 126. Light emitted from the light sources 136 engages or makes contact with the one or more first surfaces 128 of the respective ones of the protrusions 126. When the light emitted from the light sources 136 makes contact with the first surface 128 of a first protrusion 126, the light may be reflected off of the first surface 128, the second surface 130, the intermediate portion 132, or a combination thereof of the first protrusion 126. The light reflected by the first protrusion 126 is directed toward a second protrusion 126, adjacent to the first protrusion 126. The second protrusion 126 reflects the light reflected by the first protrusion 126 in a similar manner as the first protrusion 126.

The light continues to be reflected off of respective ones of the protrusions 126 across the length L of the light curtain 110. As the light is reflected off of each protrusion 126, the light curtain 110 is illuminated. Illumination of the light curtain 110 may give an appearance of a light source being disposed directly behind the light curtain 110. Light emitted or radiated from the light curtain 110 is directed toward the inner lens 108, as described above. The inner lens 108 may alter an appearance of the light emitted or radiated from the light curtain 110. Similarly, the outer lens 102 may further alter the light emitted or radiated from the light curtain 110, as described above.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A low profile light assembly for a vehicle, comprising:
   a first lens defining an inner surface and an outer surface, the outer surface having an outer profile that provides a portion of an external profile of the vehicle;
   a second lens defining an inner surface and an outer surface, the second lens being positioned such that the outer surface of the second lens faces the inner surface of the first lens; and
   a light curtain physically coupled to the second lens, the light curtain having:
      an outer surface defining a contour that corresponds to a contour defined by an inner surface of the second lens;
      an inner surface that includes protrusions evenly spaced along a length of the inner surface, the protrusions including a first surface that extends a width of the inner surface; and
      at least one light source that is directed toward at least some of the first surfaces of the protrusions, wherein the light curtain includes a first side extending transversely in relation to the inner and outer surfaces so as to connect the inner and outer surfaces, the at least one light source being disposed on the first side of the light curtain.

2. The assembly of claim 1, wherein the at least one light source is a light emitting diode.

3. The assembly of claim 1, wherein the at least one light source is electrically coupled to a printed circuit board.

4. The assembly of claim 1, wherein the protrusions are spaced apart such that light emitted from the at least one light source traverses the length of the inner surface of the light curtain using the protrusions.

5. The assembly of claim 1, wherein the protrusions are spaced two millimeters apart from one another.

6. The assembly of claim 1, wherein the at least one light source includes two light sources directed toward at least some of the first surfaces of the protrusions.

7. The assembly of claim 1, wherein the inner surface of the light curtain has an arcuate profile.

8. A system comprising:
   a first lens defining an inner surface and an outer surface, the outer surface having an outer profile that provides a portion of an external profile of a vehicle;
   a second lens defining an inner surface and an outer surface, the second lens being positioned such that the outer surface of the second lens faces the inner surface of the first lens; and
   a light curtain having:
      an outer surface defining a contour that corresponds to a contour defined by an inner surface of the second lens;

an inner surface that includes protrusions evenly spaced along a length of the inner surface, the protrusions including a first surface that extends a width of the inner surface;

a first side extending transversely in relation to the inner and outer surfaces of the light curtain so as to connect the inner and outer surfaces; and at least one light source disposed on the first side of the light curtain, wherein the at least one light source is directed toward at least some of the first surfaces of the protrusions.

9. The system of claim 8, wherein the light curtain is physically coupled to the second lens.

10. The system of claim 8, wherein the at least one light source is a light emitting diode.

11. The system of claim 8, wherein the at least one light source is electrically coupled to a printed circuit board.

12. The system of claim 8, wherein the protrusions are spaced apart such that light emitted from the at least one light source traverses the length of the inner surface of the light curtain using the protrusions.

13. The system of claim 8, wherein the protrusions are spaced two millimeters apart from one another.

14. The system of claim 8, wherein the at least one light source includes two light sources directed toward at least some of the first surfaces of the protrusions.

15. The system of claim 8, wherein the inner surface of the light curtain has an arcuate profile.

16. A light assembly for a vehicle comprising:
a first lens defining an inner surface and an outer surface, the outer surface having an outer profile that provides a portion of an external profile of the vehicle;

a second lens defining an inner surface and an outer surface, the second lens being positioned such that the outer surface of the second lens faces the inner surface of the first lens; and a light curtain having:
an outer surface defining a contour that corresponds to a contour defined by an inner surface of the second lens;

an inner surface having an arcuate shape that includes protrusions spaced two millimeters apart along a length of the inner surface, the protrusions including a first surface that extends a width of the inner surface;

a first side extending transversely in relation to the inner and outer surfaces of the light curtain so as to connect the inner and outer surfaces; and at least one light source disposed on the first side of the light curtain, wherein the at least one light source is directed toward at least some of the first surfaces of the protrusions.

17. The assembly of claim 16, wherein the at least one light source includes two light sources directed toward at least some of the first surfaces of the protrusions.

18. The assembly of claim 17, wherein the two light sources include light emitting diodes.

* * * * *